United States Patent [19]

Rudd et al.

[11] 4,396,201

[45] Aug. 2, 1983

[54] MISSILE MOUNTED SEAL

[75] Inventors: George E. Rudd, Murrysville; Joseph F. Meier, Export, both of Pa.

[73] Assignee: The United States of America as represented by the Secretary of the Air Force, Washington, D.C.

[21] Appl. No.: 308,974

[22] Filed: Oct. 6, 1981

[51] Int. Cl.³ .............................................. F16J 15/32
[52] U.S. Cl. ................................. 277/212 F; 277/214
[58] Field of Search ............................ 277/212 F, 214

[56] References Cited

U.S. PATENT DOCUMENTS 2,668,067  2/1954  Fitzsimmons .................. 277/212 F
3,995,332  12/1976  Forchini ......................... 277/212 F
4,033,593  7/1977  Molnar et al. ...................... 277/214

Primary Examiner—Robert I. Smith
Attorney, Agent, or Firm—Donald J. Singer; Bobby D. Scearce

[57] ABSTRACT

A novel seal is provided for sealing the annular gap between a tube and a cylinder, such as between a missile and its launch canister, which comprises an annular base for engaging the outer surface of the missile, an annular flap formed integral with the base and extending radially outwardly and downwardly to seal the annular gap between missile and canister, the annular flap having formed thereon means to control the location of buckling around the periphery thereof upon compression of the seal within the gap. The means to control the buckling of the flap include, in one representative embodiment, a plurality of prebuckling webs or, in an alternative embodiment, a plurality of slit pairs regularly spaced around the circumference of the flap, to promote buckling of the seal at predetermined locations.

19 Claims, 2 Drawing Figures

U.S. Patent      Aug. 2, 1983      4,396,201
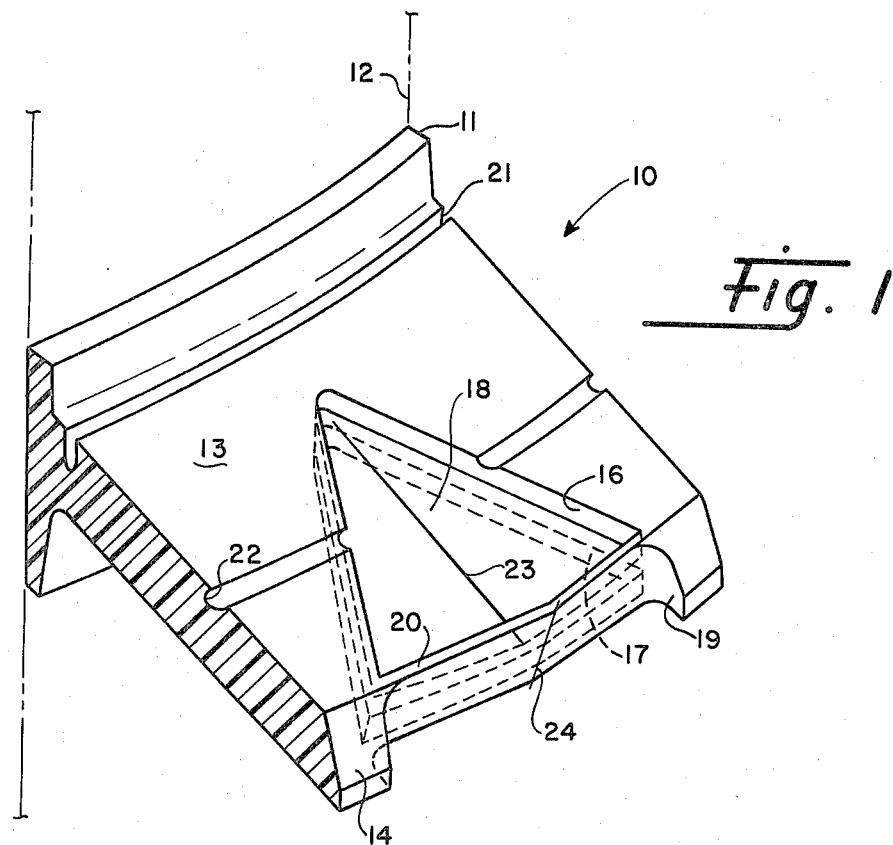
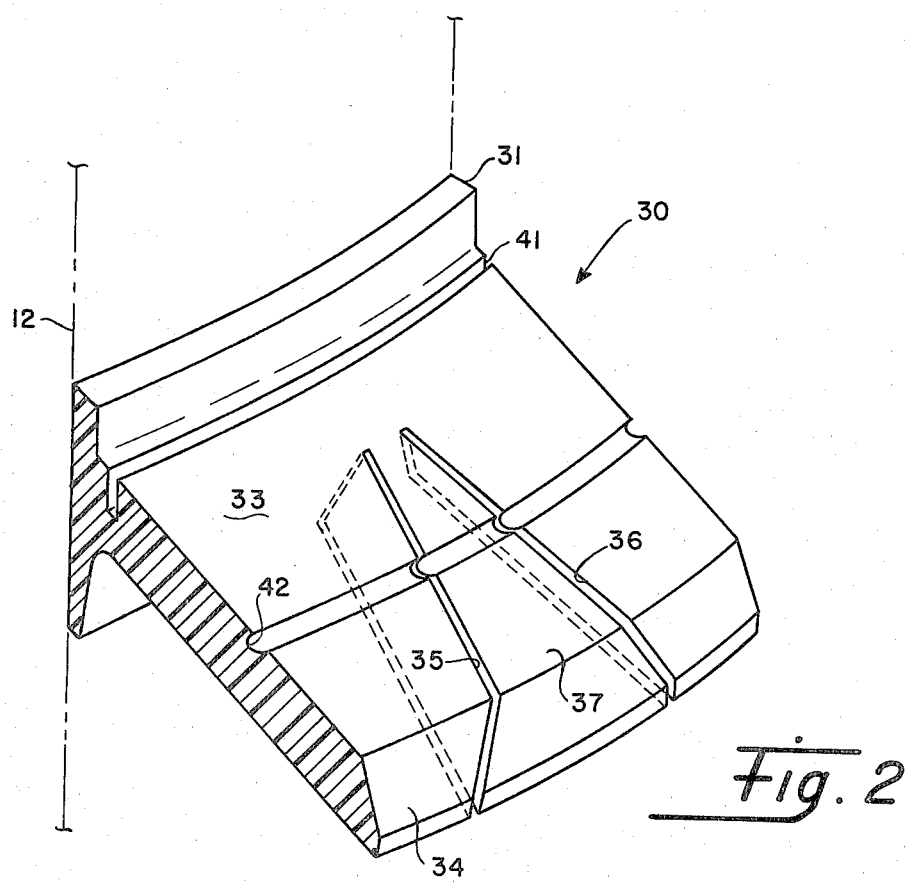

MISSILE MOUNTED SEAL

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of seals configured to seal large annular gaps, and more particularly to elastomeric annular seals configured to be mounted on a missile for sealing the annular gap between the surface of a missile and its launch tube or canister.

Launch seals configured to fill the annular gap between the outer surface of a missile and the inner surface of its launch tube or canister are of basically two types: those configured for mounting to the inner surface of the canister and those configured to be mounted to the outer surface of the missile or to a deployable ring attached to the missile. Canister mounted seals are characteristically stretched in situ within the annular gap between missile and canister and remain within the canister upon launch of the missile. The missile mounted seal, on the other hand, is characteristically compressed in situ and is launched with the missile. Both the canister mounted seal and the missile mounted seal must, however, perform the functions within the canister of providing a sufficient sliding gas seal within the annular gap against excessive launch pressure leakage, and of resiliently holding the missile within the canister. Representative of prior art seals of the canister mounted type are such as those disclosed by or referenced in U.S. Pat. No. 4,033,593 to Molnar et al. Typically, solid elastomers are selected for the annular seals because of the flexibility and high strength which characterize these materials.

In the relaxed condition, the outside diameter of a missile mounted launch seal must be larger than the inside diameter of the canister in order to provide the desired seal. Therfore, such a seal must be compressed prior to loading of the missile into the canister and remain somewhat compressed in place. To a first approximation, the solid elastomers suitable for use as launch seals are incompressible. Therefore, a missile mounted seal having a substantially constant annular cross section will buckle unpredictably when circumferentially compressed. A significant pressure leak would then occur at the buckled locations around the seal periphery. To avoid this eventuality, the novel missile mounted seal of the present invention provides, in its various embodiments, means for controlling the buckling of the seal upon compression thereof, without allowing excessive pressure leakage around the periphery of the seal in the buckled condition.

It is therefore, an object of the present invention to provide an improved seal configured to seal large annular gaps.

It is a further object of the present invention to provide an improved seal for sealing the space between a missile and its launch canister.

It is yet a further object of the present invention to provide a missile mounted launch seal configured for accommodating compressive hoop strain imposed thereon by providing controlled buckling thereof in situ, without allowing excessive launch pressure leakage.

These and other objects of the present invention will become apparent as the detailed description of specific embodiments thereof proceeds.

SUMMARY OF THE INVENTION

In accordance with the foregoing principles and objects of the present invention, a novel seal is provided for sealing the annular gap between a tube and a cylinder, such as between a missile and its launch canister, which comprises an annular base for engaging the outer surface of the missile, an annular flap formed integral with the base and extending radially outwardly and downwardly to seal the annular gap between missile and canister, the annular flap having formed thereon means to control the location of buckling around the periphery thereof upon compression of the seal within the gap. The means to control the buckling of the flap include, in one representative embodiment, a plurality of prebuckling webs or, in an alternative embodiment, a plurality of slit pairs, regularly spaced around the circumference of the flap, to promote buckling of the seal at predetermined locations.

DESCRIPTION OF THE DRAWINGS

The present invention will be more clearly understood from the following detailed description of specific representative embodiments thereof read in conjunction with the accompanying drawings wherein:

FIG. 1 is a perspective view of an annular section of the novel seal of this invention illustrating the buckled web embodiment.

FIG. 2 illustrates the slitted wedge embodiment of the seal of this invention.

DETAILED DESCRIPTION

FIG. 1 is a drawing of a section of the annular seal in one of the contemplated embodiments of this invention, and illustrates, as the means for controlled buckling of the seal, the buckled web configuration. For purposes of demonstration of the invention, two different sizes of annular seals were constructed, one configured for a 24-inch (60.96 cm) inside diameter canister, and one configured for a 54-inch (137.16 cm) inside diameter canister. Therefore, for purposes of illustration, the annular section shown in FIG. 1 may be referred to as that of either size model since, as hereinafter described, the size and configuration of the individual webs in each model were substantially the same.

As shown in FIG. 1, the buckled web seal 10 of this embodiment comprises an annular base 11 for engaging the outer surface of missile 12 or a deployable ring attached thereto. Annular flap 13 is molded integral with base 11 and serves to seal the annular gap between missile 12 and the canister (not shown). Annular flap 13 has the geometry of a conical section joining base 11 on its smaller diameter and extending radially outwardly and downwardly, terminating on its larger diameter with a bevel 14 configured to slideably engage the inner surface of the canister. Annular flap 13 may be of any convenient thickness consistent with its function although it was found in the models constructed that a substantially uniform thickness of from about 0.62 inch (1.57 cm) to about 0.75 inch (1.91 cm) proved acceptable.

Annular seal 10 has around its circumference a plurality of webs 18 having a configuration substantially as depicted in FIG. 1. Webs 18 were cast into the flap 13 of seal 10 during the molding of seal 10 according to procedures hereinafter described using appropriately shaped mold inserts.

Each web section comprised a first triangularly shaped recess 16 in the upper (low Pressure side) surface of flap 13, and a second triangularly shaped recess 17, disposed oppositely recess 16, on the lower (high pressure side) surface of flap 13. Each pair of oppositely disposed recesses 16 and 17 therefore formed a triangularly shaped web 18 in flap 13 of substantially reduced thickness compared to overall thickness of flap 13. The cross section of web 18 is chevron shaped to produce a prebuckled web along line 23 so that web 18 will buckle radially inward as the seal is compressed.

Adjacent each web 18 in the periphery of flap 13 is a radial recess 19 having a chord length of about the same length as that of the adjacent recesses 16, 17. Annular web 20 of flap 13 separates radial recess 19 from triangular recesses 16, 17.

A first annular groove 21, having a depth of about one-half the thickness of flap 13, is provided in the upper surface of flap 13 near and concentric with base 11. Groove 21 permits downward flexing of flap 13 relative to annular base 11. A second annular groove 22 may be provided in the upper (low pressure side) surface of flap 13, concentric with base 11, and disposed intermediate base 11 and the outer periphery of flap 13. Groove 22 is provided to receive a circular clamp (not shown), such as a cable adapted to compress annular seal 10 downward and radially inward to facilitate insertion of missile 12 into its canister; the clamp may be designed for removal thereafter to allow annular seal 10 to expand in place to seal the gap between missile and canister. Both grooves 21 and 22 may be provided in seal 10 during the molding of seal 10 as hereinafter described. Other techniques could be used to compress the seal that may not require the inclusion of groove 22.

It may be desirable to provide, as part of the molding of seal 10, an annular webbed section 20 having a prebuckled condition along a line such as line 24. Experimental tests on the seal 10 indicated that by prebuckling web 20 such as along line 24, web 20 may be made to preferentially buckle radially outward upon compression of seal 10, which results in a reduction of leakage around seal 10 as compared to inward buckling of web 20.

Webs 18 and 20 in seal 10 may be of any convenient size or shape for the function thereof as described herein, and the just described shapes are not necessarily limiting of the novel seal of this invention as is suggested by the description of an alternate embodiment hereinafter. Notwithstanding, fully functionally satisfactory models of the novel seal of this invention were constructed for demonstration purposes for a 24-inch (60.96 cm) and a 54-inch (137.16 cm) canister, having a flap 13 of from about 0.62 inch (1.57 cm) to about 0.75 inch (1.91 cm) in thickness, triangularly shaped web 18 of about 0.15 inch (0.38 cm) thickness, a radial recess 19 defining a chord length of about 2.60 inches (6.60 cm), recesses 16, 17 having a radial dimension of about 3.23 inches (8.20 cm), and an annular web section 20 of about 0.10 inch (0.254 cm) thickness.

Each of the 24-inch and 54-inch models of the seal 10 constructed in demonstration of the invention herein contained a plurality of webs 18 and 20. The 24-inch model had eight such webs regularly spaced around the circumference of flap 13. The dimensions of the webs as just described are such that the 2.60 inch chord length of each web 20 is reduced by about 1.06 inches when the overall diameter of seal 10 (26.7 inches) is compressed to 24 inches, the measure of compression given by, $$\frac{\pi(26.7 - 24.0)\text{inch}}{8 \text{ webs}} = 1.06 \text{ inch/web}.$$

The 54-inch model had sixteen webs 18, 20 to provide substantially the same measure of compression per web. Thus, with the missile inserted into the canister, the seal 10 compressed up to about 40%. The degree of compression within the annular gap between missile and canister and the geometry which the seal 10 assumed upon compression permitted eccentricity of missile loading for launch angles approaching 45° without destroying the effectiveness of seal 10 as a pressure barrier.

An alternative embodiment of the novel seal of this invention is shown in annular section in FIG. 2. As shown therein, slitted seal 30 comprises an annular base 31, annular flap 33, peripheral bevel 34, annular groove 41 and groove 42, each part having the same function, respectively, as similarly named parts 11, 13, 14, 21 and 22 of the embodiment depicted in FIG. 1.

Seal 30 has around its circumference a plurality of radially diverging slit pairs 35, 36 substantially as shown in FIG. 2, to define wedge sections 37 in annular flap 33. Slits 35 and 36 are cut in flap 33 at opposite angles relative to the surface of flap 33 and are disposed to converge radially outwardly relative to a radius of seal 30 to provide a wedge 37 which is easily flexed downwardly.

In this embodiment, groove 42 may be used to receive circular clamp in manner similar to groove 22 of FIG. 1, to compress seal 30 to facilitate insertion of the missile 12 into its canister. Upon compression of seal 30, buckling occurs preferentially at wedge sections 37 resulting in wedges 37 being compressed to a greater degree than the remainder of flap 33.

Functionally satisfactory seals 30 had slits 35, 36 of about 2.8 inches (7.1 cm) cut into flap 33 at opposing angles of about 30° to the lower surface of flap 33, and separated by about 0.5 inch (1.27 cm) at their closest point and about 1.25 inch (3.18 cm) at the periphery of flap 33.

All models of the novel seal, either of the webbed or slitted configuration, which were fabricated for evaluation were cast of DuPont Adiprene L167/MOCA. The use of this elastomer was by way of demonstration only, and not by way of limitation, since, as would occur to one with skill in the field of elastomers, many other castable or moldable elastomeric materials, including certain high modulus fabric reinforced elastomers may be appropriate for use with the seals of this invention.

Adiprene L167/MOCA is a liquid polyether urethane elastomer which may be cured to a strong, rubbery solid by reaction of the terminal isocyanate groups with polyamine or polyol compounds; it is a honey colored viscous liquid (4700 to 6500 cps at 30° C.) with an available isocyanate content of from about 6.15% to about 6.55%. This prepolymer is based on polyoxytetramethylene glycol and tolylene diisocyanate and has an equivalent weight of about 670.

MOCA (4,4'-methylene-bis(2-chloroaniline)), a diamine curing agent for isocyanate-containing polymers, has an equivalent weight of 133.5; it is a light tan solid, a pellet form, having a specific gravity of 1.44 and a melting range of 100°–109° C.

Casting of two-foot diameter model webbed seals according to the embodiment of the invention herein as depicted in FIG. 1 was performed according to the following procedure, which, again, is by way of demonstration only and not by way of limitation of the breadth of the invention herein. Bulk quantities of Adiprene L167 were preheated to 40°–50° C.; two batches of 3000 grams each were weighed into two-gallon containers and outgassed under vacuum until the vigorous bubbling ceased. Two ½-gallon cans, each containing 600 grams MOCA were opened, covered with aluminum foil, and heated to 120°–160° C. in a small gravity oven. One of the cans of hot MOCA was poured into one of the containers of outgassed L167 which had been cooling for about one hour, and the two components were mixed for about two minutes with an air stirrer at low speed. While one mixture was being poured into the mold, the second batch of Adiprene L167/MOCA was blended and poured into the mold. Two mixes were required to obtain adequate mold fill. The NCO:NH$_2$ ratio of both mixtures was maintained at about 1.0 throughout this procedure. After both mixtures were carefully and slowly cast into a preheated (60°–65° C.) two-foot diameter seal mold, the mold was placed into an oven for curing. The cast elastomeric seal was maintained in the mold at 60°–65° C. for two hours, removed from the mold, and allowed to cool slowly to room temperature. Seals prepared in this manner were cured at room temperature for at least three days prior to testing.

The preparation and casting of larger 54-inch diameter seals followed substantially the same procedure as above for the two-foot seals, except required a greater quantity of MOCA and L167.

Models of the slitted seal as shown in FIG. 2 were also prepared for testing following the same procedures as set forth above for the webbed seal configuration.

Seals of this invention, cast of Adiprene L167/MOCA were mounted on a 36,000 lb. missile and tested successfully. The seals satisfied anticipated leakage criteria at launch pressures up to 90 lb/in$^2$(ga) and annular gaps up to 2.3 inches.

The present invention, as hereinabove described, provides a novel seal for sealing large annular gaps. It is understood that certain modifications to the invention may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. A flexible seal for sealing the annular space between a cylinder and a tube, comprising:
   a. an annular base for engaging the outer surface of said cylinder;
   b. a flexible annular flap, supported by said base, sealing said annular space, said annular flap having an outer diameter larger than the inner diameter of said tube; and
   c. said flap including means for promoting buckling of said flap at a plurality of predetermined locations around the periphery of said flap.

2. The seal as recited in claim 1 wherein said annular flap is formed integral with said annular base.

3. The seal as recited in claim 1 or claim 2 further comprising an annular groove in a surface of said flap, near said base and concentric therewith, to facilitate axial flexing of said flap.

4. The seal as recited in claim 1 or claim 2 wherein said flap comprises an elastomer.

5. The seal as recited in claim 1 or claim 2 wherein said flap has a generally frustoconical shape joining said base on the smaller diameter thereof.

6. The seal as recited in claim 1 further comprising a bevel on the peripheral edge of said annular flap.

7. A flexible seal for sealing the annular space between a cylinder and a tube, comprising:
   a. an annular base for engaging the outer surface of said cylinder;
   b. a flexible annular flap, supported by said base, sealing said annular space, said annular flap having an outer diameter larger than the inner diameter of said tube; and
   c. said flap including a plurality of webs formed in said flap, regularly spaced around the surface of said flap, each of said webs comprising a substantially triangularly shaped section of said flap of substantially reduced thickness, one side of each said triangularly shaped section being near the periphery of said flap.

8. The seal as recited in claim 7 further comprising a radial recess in said flap, on the periphery thereof and adjacent each of said webs.

9. The seal as recited in claim 7 wherein said annular flap is formed integral with said annular base.

10. The seal as recited in claim 7 further comprising an annular groove in a surface of said flap, near said base and concentric therewith, to facilitate axial flexing of said flap.

11. The seal as recited in claim 7 wherein said flap comprises an elastomer.

12. The seal as recited in claim 7 wherein said flap has a generally frustoconical shape joining said base on the smaller diameter thereof.

13. The seal as recited in claim 7 further comprising a bevel on the peripheral edge of said annular flap.

14. A flexible seal for sealing the annular space between a cylinder and a tube, comprising:
   a. an annular base for engaging the outer surface of said cylinder;
   b. a flexible annular flap, supported by said base, sealing said annular space, said annular flap having an outer diameter larger than the inner diameter of said tube; and
   c. said flap including a plurality of radially diverging slit pairs in said flap and regularly spaced around the surface of said flap, each of said pairs defining a flexible wedged section of said flap.

15. The seal as recited in claim 14 wherein said annular flap is formed integral with said annular base.

16. The seal as recited in claim 14 further comprising an annular groove in a surface of said flap, near said base and concentric therewith, to facilitate axial flexing of said flap.

17. The seal as recited in claim 14 wherein said flap comprises an elastomer.

18. The seal as recited in claim 14 wherein said flap has a generally frustoconical shape joining said base on the smaller diameter thereof.

19. The seal as recited in claim 14 further comprising a bevel on the peripheral edge of said annular flap.

* * * * *